United States Patent [19]

Comstock

[11] Patent Number: 4,857,755
[45] Date of Patent: Aug. 15, 1989

[54] CONSTANT POWER SYSTEM AND METHOD

[76] Inventor: W. Kenneth Comstock, 8152 South Danish Rd., Sandy, Utah 84120

[21] Appl. No.: 249,672

[22] Filed: Sep. 27, 1988

[51] Int. Cl.$^4$ .............................. H02J 3/06; H02J 9/08; H02P 9/06
[52] U.S. Cl. ........................................ 307/47; 307/68; 322/29; 322/35; 322/40
[58] Field of Search ......................... 322/40, 42, 29, 35; 307/47, 68

[56] References Cited

U.S. PATENT DOCUMENTS

| | | | |
|---|---|---|---|
| 2,885,566 | 5/1959 | Sadler et al. | 322/40 X |
| 2,911,541 | 11/1959 | Neufville et al. | 307/68 X |
| 3,187,250 | 6/1965 | Born et al. | 322/40 X |
| 3,683,255 | 8/1972 | Schroeder | 322/35 X |
| 4,731,547 | 3/1988 | Alexanduff et al. | 307/68 X |

Primary Examiner—R. J. Hickey
Attorney, Agent, or Firm—Thorpe, North & Western

[57] ABSTRACT

A method and system for maintaining a substantially constant output of electrical power includes an engine for operating upon receipt of a signal, an electric motor, a flywheel mounted to rotate when either the engine or the motor is operated, a generator for producing electrical power when operated, and a hydraulic coupling system for driving the generator when the flywheel is rotated. A control unit allows application of power from a conventional power source to the electrical motor so long as the output power level from the conventional power source is adequate and thus the flywheel is rotated and the generator is driven to provide output power to a load. The control unit also allows application of power directly from the power source to the load. Upon interruption of power from the conventional power source, the control unit causes cut-off of power from the source to both the motor and the load, and applies a signal to the engine to start the engine. The engine then rotates the flywheel to again drive the generator to maintain the power output.

10 Claims, 1 Drawing Sheet

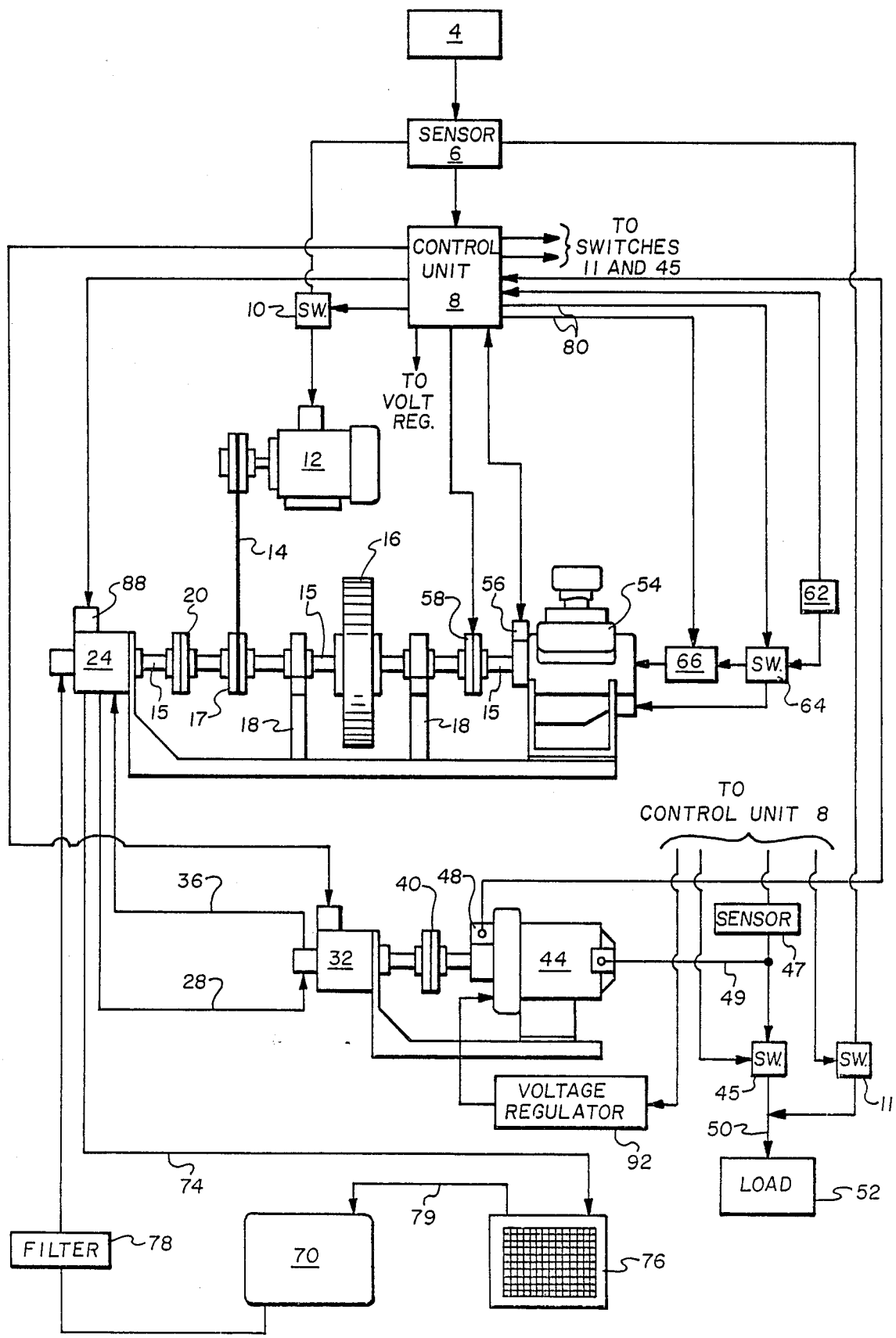

CONSTANT POWER SYSTEM AND METHOD

BACKGROUND OF THE INVENTION

This invention relates to a system for providing a constant supply of power.

The need for uninterruptable power sources is especially acute in the computer field since an interruption of power may result in the loss of information stored in memory and thus the loss of many hours or days computing effort. Although computer memories have been developed which can maintain stored information even with an interruption of power, such memories are still quite expensive and not yet in widespread use. There is also a need for secure power sources in hospitals, medical emergency facilities, and the like.

There are a number of arrangements for protecting against power interruption or failure, ranging from use of an array of batteries to back up the commercial power source to provision of an entirely separate power generating plant. Some previously proposed systems for providing uninterrupted power are disclosed in U.S. Pat. Nos. 3,345,517, 3,558,901, 3,675,112, 2,194,822, 2,783,393, 2,917,635, 3,178,632, 3,221,172, 3,283,165, 3,477,013, and 3,609,426. These and other prior art systems are typically expensive, not entirely fail-safe, or rough in making the transition between the primary power source and the stand-by source. Since the need for emergency power generally arises only infrequently, it would be desirable that such need could be satisfied with a low cost, reliable and efficient backup power system.

SUMMARY OF THE INVENTION

It is an object of the invention to provide an efficient and reliable system for maintaining a substantially constant output of electrical power.

It is another object of the invention to provide such a system in which transition from the normal power supply to the backup power supply occurs in a smooth and substantially uninterrupted fashion.

The above and other objects of the invention are realized in an illustrative constant power supply system for use in conjunction with a commercial source of power, said system including an engine for operating in response to a first signal, an electric motor, a flywheel mounted to rotate when the electric motor is operated, a first switch coupling the commercial source of power to the motor, a second switch coupling the source of power to a load, and a control unit coupled to the first switch for controlling the application of power from the source of power to the electric motor and to the second switch for controlling application of power directly from the source of power to the load. A coupling system connects the electric motor to a generator for causing the generator to operate to produce electrical power when the electric motor is in operation and also supply power via a third switch to the load. When power from the source is interrupted, the control unit supplies a first signal to the engine and opens the first and second switches to terminate conveyance of power to the electric motor and directly to the load. The engine, after it reaches an appropriate speed, is then connected to the coupling system to keep the generator operating to produce power. While the engine is getting up to speed, the flywheel maintains the operation of the generator. With this configuration, an interruption of power from the commercial source results in the engine being started to operate the generator and continue the supply of power.

In accordance with one aspect of the invention, the coupling system for coupling the electric motor and engine to the generator includes a jack shaft coupleable to the electric motor, the engine and a variable displacement hydraulic pump to pump hydraulic fluid when either the electric motor or the engine are operated. The coupling system also includes a variable displacement hydraulic motor coupled to the generator to cause the generator to operate when hydraulic fluid is pumped to the hydraulic motor.

BRIEF DESCRIPTION OF THE DRAWING

The above and other objects, features and advantages of the invention will become apparent from a consideration of the following detailed description presented in connection with the accompanying drawing which shows a diagramic view of a constant power supply system made in accordance with the principles of the present invention.

DETAILED DESCRIPTION

The constant power supply system of the present invention is adapted for use with a conventional power source 4 and is designed to detect an interruption of power, from the source 4 (or a variation of the power level from a predetermined range) and to immediately start an internal combustion engine 54 to operate a generator or alternator 44 to maintain the power output on a bus 50 to a load 52.

The system includes a control unit 8 coupled to a power level sensor 6 which is coupled to the power source 4. The power source 4 supplies power via switch 10 to a motor 12, and via switch 11 directly to the bus 50. When the output level from the source 4 falls outside a predetermined range, the control unit 8 signals switches 10 and 11 to open the switches and interrupt the flow of power to the motor 12 and the bus 50, and supplies a starting signal via leads 80 to a switch 64 and a starter motor 66. The operation of the system following variation of power from the predetermined range will be discussed momentarily. The power level sensor 6 might illustratively include a phase monitor unit for detecting the output level of the power source. The control unit 8 might illustratively include a microprocessor, such as an IBM PC XT or compatible personal computer and a signal generator for supplying signals to the switches 10, 11 and 64, and to the starter motor 66 when the output of the power source 4 falls outside the predetermined range.

When power flows normally to the motor 12, the motor is operated to drive a belt 14 and rotate a jack shaft 15. A flywheel 16 is mounted on the jack shaft 15 which is mounted to rotate on support braces 18. The jack shaft 15 is coupled by way of coupling joint 20 to a variable displacement hydraulic pump 24. The flywheel 16 is provided to store kinetic energy and maintain the jack shaft 15 and thus the hydraulic pump 24 in operation even though there is an interruption of power to the motor 12 as will be further explained. The hydraulic pump 24, being a variable displacement pump, provides efficiency and thus economy, and high torgue at low speeds.

The hydraulic pump 24 is coupled by way of a feed conduit 28 to a variable displacement hydraulic motor 32 and also by a return conduit 36. The hydraulic motor 32 is coupled by way of a coupling joint 40 to a generator 44. A generator speed sensor 48 is attached to the generator 44 to determine the speed of the generator for purposes to be discussed later. When operated, the generator 44 produces electrical power on output line 5 which is supplied by way of a switch 45 to the bus 50, and by way of a power level sensor 47 to the control unit 8.

The engine 54 is coupleable by way of a clutch 58 to the jack shaft 15. When the engine 54 is started, following disruption of power from the power source 4, it continues rotation of the jack shaft 15 which operates the hydraulic pump 24 to thereby operate the generator 44. The clutch 58 operates in response to signals from the control unit 8 to connect or disconnect the engine 54 from the jack shaft 15. A speed sensor 56 is attached to the engine 54 to monitor the speed of the engine and provide a signal indicating the speed to the control unit 8. A battery 62 is provided to supply power to the starter motor 66 via the switch 64 to start the engine 54 and also to supply power to the control unit 8.

Cooling of the hydraulic fluid and thus of the hydraulic pump 24 and hydraulic motor 32 is accomplished by provision of a hydraulic fluid reservoir 70, a conduit 72 connecting the reservoir to the hydraulic pump 24, a conduit 74 connecting the hydraulic pump to a heat exchanger 76, and a conduit 79 connecting the heat exchanger to the reservoir 70. A filter 78 is in line with the conduit 72 to maintain the hydraulic fluid free of contaminants. Excess hydraulic fluid drains from the hydraulic pump 24 into conduit 74 and then to the heat exchanger 76 where heat is extracted from the fluid and dispensed to heat the surrounding area. From the heat exchanger 76, hydraulic fluid flows to the reservoir 70 which holds the fluid needed to charge the pump 24. Cooled hydraulic fluid flows from the reservoir 70 to the pump 24 as needed to drive the motor 32.

In operation, when power is being supplied by the power source 4 to operate the motor 12, the motor rotates the jack shaft 15 by drive belt 14 to drive the hydraulic pump 24 which supplies hydraulic fluid via the conduit 28 to operate the hydraulic motor 32. The hydraulic motor 32, in turn, drives the generator 44 to provide output power on lead 49.

In order to maintain a substantially constant power output from the generator 44, the generator speed sensor 48 continuously monitors the speed of operation of the generator and supplies signals to the control unit 8 indicating this speed. If the speed is lower than desired (caused for example by an increase in the amount of power drawn by the load 52 from the generator 44), then the control unit 8 signals a generator actuator 88 (governor) coupled to the hydraulic pump 24 to increase the speed of operation of the pump. The generator actuator 88 controls the flow of oil from the hydraulic pump 24 and thus the speed of operation of the hydraulic motor 32 and thus the generator 44. As noted earlier, the hydraulic pump 24 is a variable displacement pump whose speed may be varied by the attached generator actuator 88. An increase in the speed of the generator 44 would similarly cause a slow down in the speed of operation of the hydraulic pump 24 in response to the generator actuator 88 receiving a signal from the control unit 8. In this manner, the speed of operation of the generator, and thus the power output therefrom, may be maintained substantially constant. The generator speed sensor 48 might illustratively be a conventional magnetic pickup counter or a speed-to-voltage signal generator, and the generator actuator 88 might illustratively be a magnetic field responsive lever controller which changes the position of an arm or lever as an input voltage or current signal changes.

When power from the power source 4 falls outside a desired range, this is detected by the control unit 8 in connection with the sensor 6 which supplies a signal to switch 10 to open the switch and a start signal via leads 80 to close the switch 64 so that current can flow from the battery 62 to the starter motor 66 and engine 54 to operate the starter motor and start the engine 54. The engine 54 could illustratively be a gasoline, natural gas, or other suitable fuel-operated engine. Energy in the flywheel 16 continues to operate the hydraulic pump 24 and thus the hydraulic motor 32 to keep the generator 44 in operation while the engine 54 is being started. After the engine 54 is started, its speed of operation is monitored by the engine speed sensor 56 which signals the control unit 8 of this speed. When the speed is determined to reach a predetermined level (corresponding roughly to the speed at which the motor 12 operates the hydraulic pump 24), the control unit 8 signals a clutch unit 58 to connect the engine 54 to the jack shaft 15 to thus maintain the operation of the pump 24, motor 32 and generator 44. The engine speed sensor 56 might advantageously be the same type of sensor as the generator speed sensor 48. The clutch unit 58 might illustratively be a magnetic clutch assembly of conventional design. The control unit 8 might illustratively include speed switches, such as TRW SW 200 model, for producing signals supplied to the generator actuator 88 and the clutch unit 58 in response to speed detection by the generator speed sensor 48 and engine speed sensor 56 respectively.

A pulley 17 which is driven by the drive belt 14 is attached to the jack shaft 15 by a slip gear so that when power to the electric motor 12 is terminated and the engine 54 "takes over", the shaft 15 will continue to be rotated but the pulley 17 will not. The motor 12 will thus not be driven while the engine 54 is operating and will therefore not be a drag on the engine.

When power from the power source 4 is again within the acceptable range following an interruption, the control unit 8 detects this and provides a signal via leads 80 to open switch 64 and terminate application of electrical current to the engine 54. The control unit 8 also signals the clutch 58 to disengage the engine 54 from the jack shaft 15.

The power output level of the generator 44 is also monitored, by a sensor 47, which signals the control unit 8 indicating the level of the output. If the level of the generator output falls outside some predetermined acceptable range (or if other parameters of the output, such as phase, frequency, etc. are different from the power signal being produced by the source 4), and the variation cannot be corrected, then the control unit 8 signals a switch 45 to open the switch and terminate the supply of power from the generator 44 to the bus 50. Of course, when the generator output is again within acceptable levels, the switch 45 is closed to again supply power from the generator to the bus 50.

In the manner described, a constant power system is provided in which power both from a generator and from a commercial power source are supplied to a load. If the power signal from either source moves outside acceptable limits, then a control unit cuts off the supply from that source to a load.

A voltage regulator 92 is coupled between the control unit 8 and the generator 44 for controlling the field voltage of the generator to maintain a regulated voltage output from the generator.

The use of a variable displacement pump 24 and a variable displacement motor 32 provides greater efficiency, and thus costs less, in the operation of the system since the efficiency is highest over a broad part of the speed range. Also the variable displacement pump and motor combination allow for output speed to be controlled by both pump displacement and motor displacement (and input speed).

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. For use in conjunction with a commericial source of power which may be interrupted, a power supply for maintaining a substantially constant output of electrical power comprising an engine for operating in response to an activate signal, an electric motor, a flywheel mounted to rotate when either the engine or the electric motor is operated, means for determining the power level of the commercial source of power, a generator for producing electrical power when operated, first switch means responsive to a first signal for connecting the commercial source of power to the electric motor, and responsive to a second signal for disconnecting the commercial source of power from the electric motor, a bus connected to a load, second switch means responsive to a third signal for connecting the commercial source of power to the bus, and responsive to a fourth signal for disconnecting the commercial source of power from the bus, third switch means responsive to a fifth signal for connecting the generator to the bus, and responsive to a sixth signal for disconnecting the generator from the bus, control means coupled to the power level determining means for supplying a first signal to the first switch means, a third signal to the second switch means, and a fifth signal to the third switch means when the power output of the commercial power is within a certain range, and for supplying a second signal to the first switch means, a fourth signal to the second switch means, and an activate signal to the engine when the power output of the commercial source is outside said range, a shaft mounted to rotate and on which the flywheel is mounted so that when the flywheel is rotated, the shaft is caused to rotate, and a hydraulic fluid drive means which includes
   a hydraulic variable displacement pump coupled to the shaft to pump hydraulic fluid when the shaft is rotated;
   a hydraulic variable displacement motor coupled to the generator to cause the generator to operate when hydraulic fluid is pumped to the hydraulic motor,
   a first conduit for carrying fluid from the hydraulic pump to the hydraulic motor when the hydraulic pump is operated, and
   a second conduit for carrying fluid from the hydraulic motor back to the hydraulic pump when the pump is operated.

2. A power supply as in claim 1 wherein said hydraulic fluid drive means further includes a tank for holding hydraulic fluid, a third conduit for supplying hydraulic fluid from the tank to the pump, a hydraulic fluid heat exchanger for extracting heat from fluid supplied thereto and projecting such heat to the surrounding area, fourth conduit means for carrying hydraulic fluid from the pump to the heat exchanger, and a fifth conduit for carrying hydraulic fluid from the heat exchanger to the tank.

3. A power supply as in claim 1 further including means for determining the speed of operation of the generator and for producing a speed signal representing such speed, and actuator means responsive to the speed signal for increasing the speed of operation of the pump if the speed of operation of the generator decreases, and for decreasing the speed of operation of the pump if the speed of operation of the generator increases.

4. A power supply as in claim 1 further including clutch means responsive to an engage signal for connecting the engine to the shaft, and responsive to a disengage signal for disconnecting the engine from the shaft, means for determining the speed of operation of the engine and for supplying an engage signal to the clutch means when the speed of the engine reaches a predetermined level, and wherein said control means operates to supply a disengage signal to the clutch means when the powe level of the commercial source of power exceeds a certain level.

5. A power supply as in claim 1 further including means for the power level of the generator output, said control means being responsive to the generator ouptut power level determining means for supplying a sixth signal to the third switch means when the power output of the generator is outside a certain predetermined range.

6. A method of maintaining a substantially constant electrical power output from either a conventional source or a back-up source of power, said method including supplying electrical power from the conventional source to both an electrical motor, to operate the motor and rotate a flywheel, and to a load, driving a variable displacement hydraulic pump when the flywheel rotates to operate the pump to pump hydraulic fluid to a variable displacement hydraulic motor, operating the hydraulic motor to drive and operate a generator causing the generator to supply electrical power to the load, disconnecting the conventional power source from the electric motor and from the load when the power output level of the conventional source falls below a certain level, starting and operating an engine when the power output level of the conventional source falls below said certain level, and continuing rotation of the flywheel by the engine to maintain operation of the generator to continue supplying power to the load.

7. A power supply system for use in conjunction with a source of electrical power comprising
   a shaft mounted to rotate,
   a flywheel mounted on the shaft to rotate when the shaft rotates,
   an electric motor coupled to the shaft to cause it to rotate when the motor is operated,
   a generator for producing electrical power when operated,
   means coupling the shaft to the generator to operate the generator when the shaft is rotated,
   an engine for operating in response to a start signal,
   means for connecting the engine to the shaft to cause the shaft to rotate when the engine is operated,
   a first switch for connecting the source of power to the electric motor when closed and disconnecting the electric motor from the source of power when opened,
   an output bus coupleable to a load,
   a second switch for connecting the source of power to the output bus when closed and for disconnecting the bus from the source of power when opened,
   a third switch for connecting the generator to the output bus when closed and for disconnecting the bus from the generator when opened,
   first means for determining the power output level of the source of power,
   second means for determining the power output level of the generator, and
   a control unit coupled to the first means and second means for closing the first and second switches when the power output level of the source of power is within a first predetermined range, for closing the third switch when the power output level of the generator is within a second predetermined range, and for opening the first and second switches and supplying a start signal to the engine when the power output level of the source of power moves outside said first predetermined range.

8. A power supply system as in claim 7 wherein said coupling means comprises
   a variable displacement hydraulic pump coupled to the shaft to operate when the shaft is rotated, and
   a variable displacement hydraulic motor hydraulically coupled to the pump to operate when the pump is operated, and coupled to the generator to drive the generator.

9. A power supply system as in claim 8 wherein said coupling system further includes,
   a tank for holding hydraulic fluid, a heat exchanger for removing heat from hydraulic fluid applied thereto and for projecting heat to the surrounding area,
   a conduit for carrying hydraulic fluid from the pump to the motor when the pump is operated,
   a conduit for carrying hydraulic fluid from the motor back to the pump when the pump is operated, and
   conduits for carrying hydraulic fluid from the tank to the pump, from the pump to the heat exchanger, and from the heat exchanger back to the tank, all when the pump is operated.

10. A power supply system as in claim 9 further comprising a voltage regulator coupled to said control unit and said generator for causing said generator to maintain a substantially constant output voltage when being operated.

* * * * *